Nov. 30, 1954  B. C. GOULD  2,695,655
SEAT CONSTRUCTION EMBODYING A DEFLECTABLE
FRAME REINFORCED BY SPRINGS
Filed Aug. 10, 1948  3 Sheets-Sheet 1
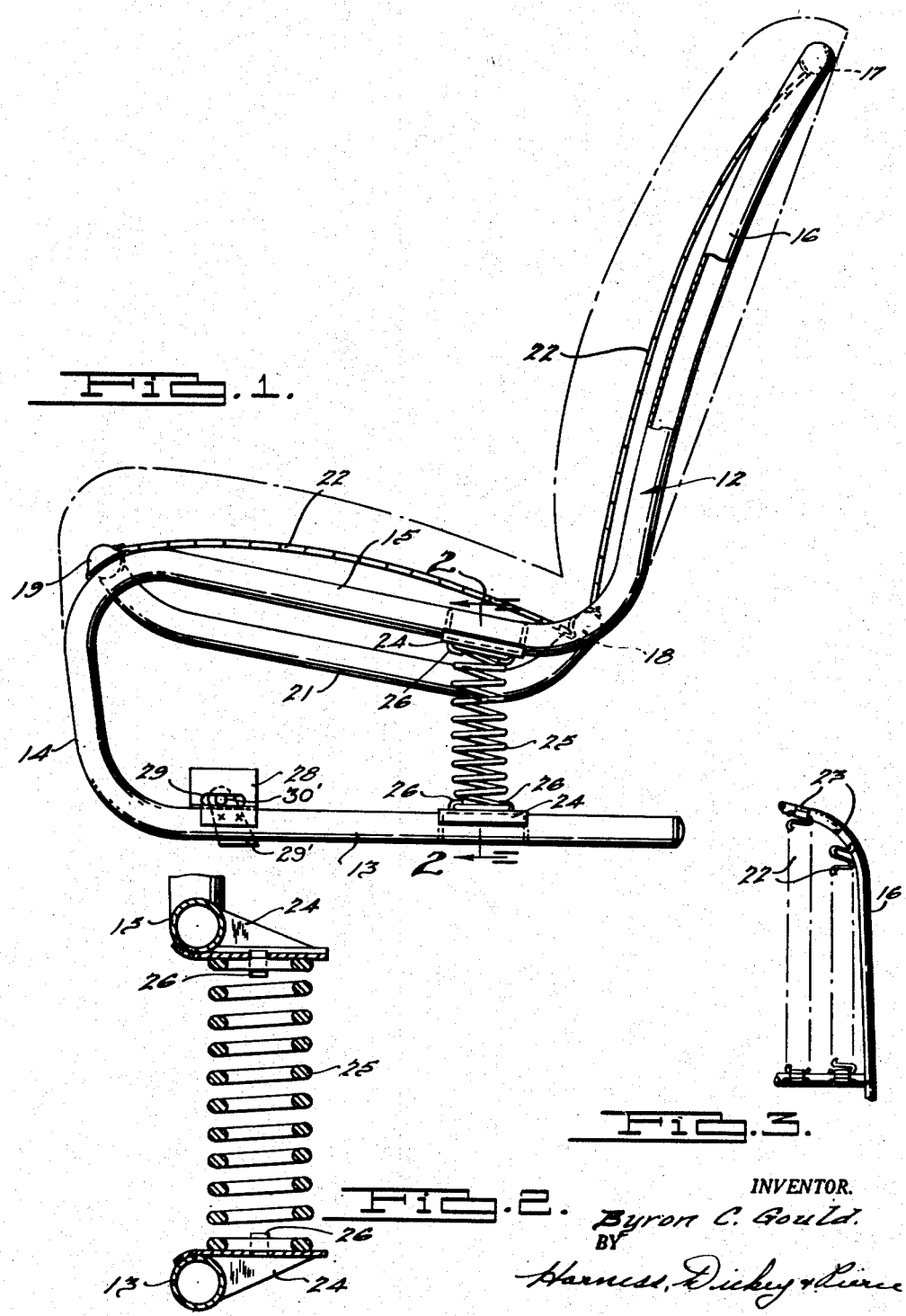
INVENTOR.
Byron C. Gould.
BY
Harness, Dickey & Pierce
ATTORNEYS.

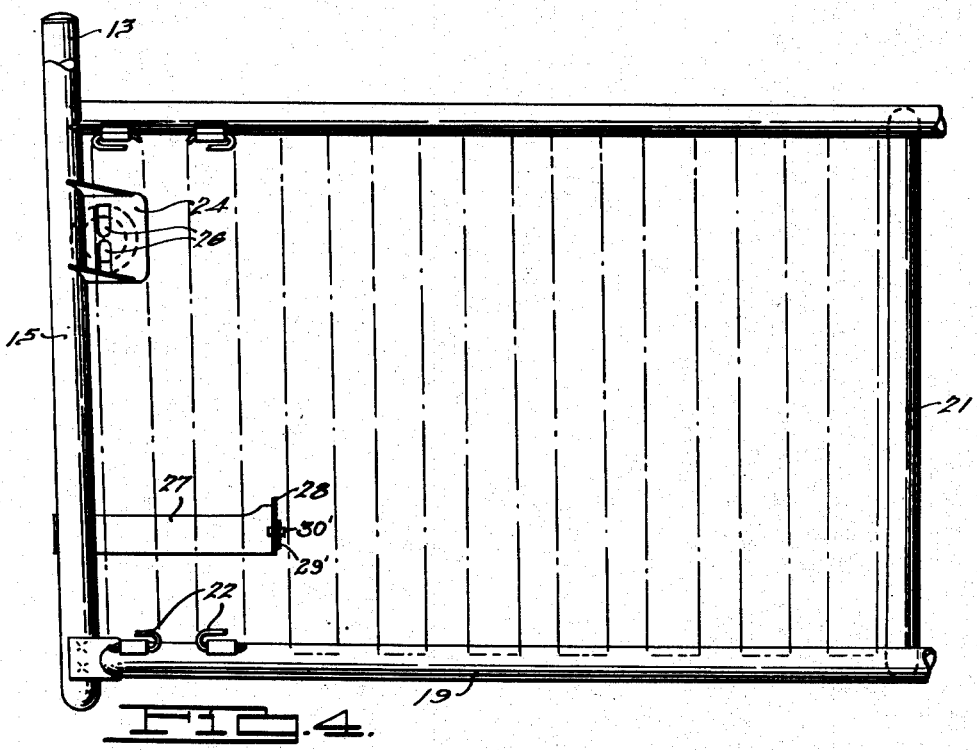
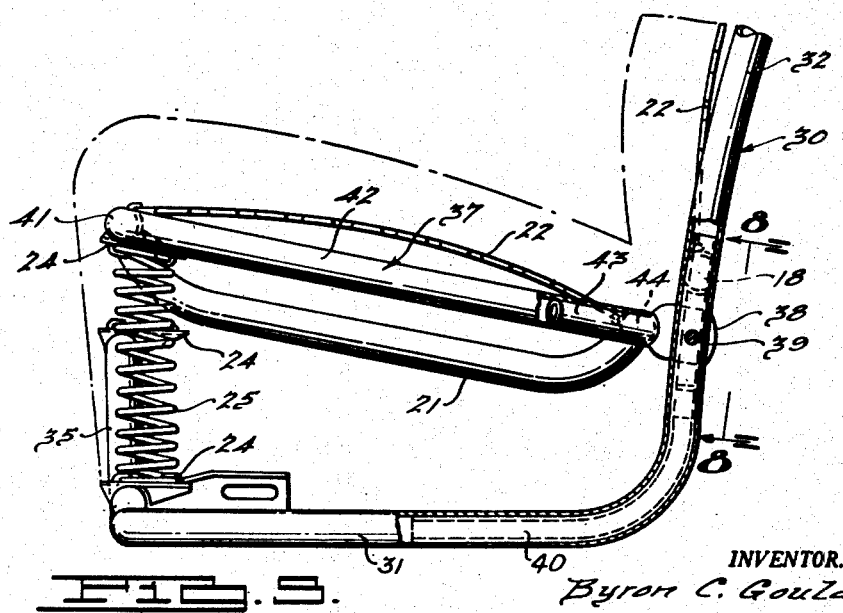

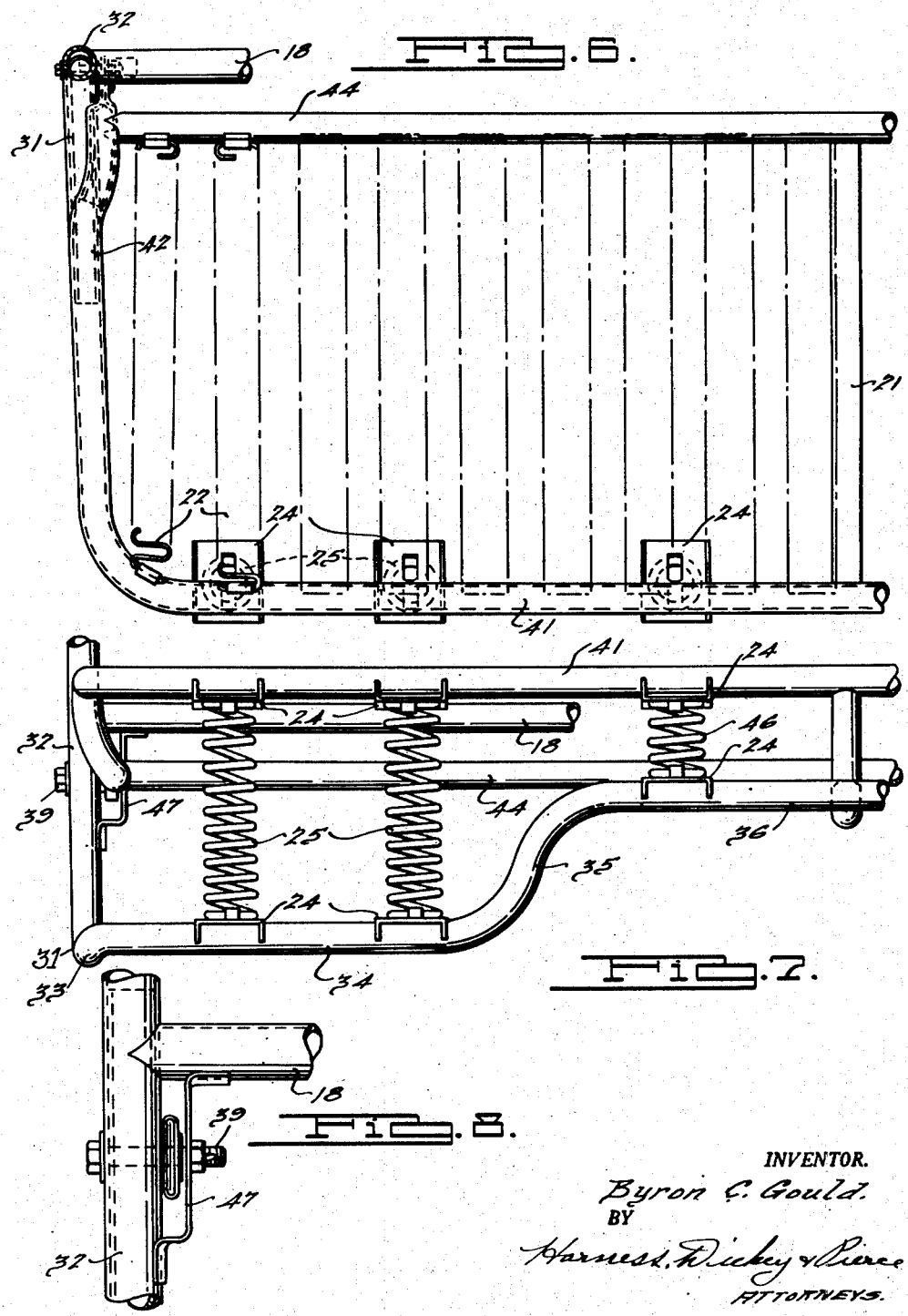

United States Patent Office 2,695,655
Patented Nov. 30, 1954

2,695,655

SEAT CONSTRUCTION EMBODYING A DEFLECTABLE FRAME REINFORCED BY SPRINGS

Byron C. Gould, Detroit, Mich., assignor, by mesne assignments, to No-Sag Spring Company, a corporation of Michigan Application August 10, 1948, Serial No. 43,448

6 Claims. (Cl. 155—55)

This invention relates to seat constructions, and particularly to a seat having a tubular frame for supporting seat and back cushions in a manner to have the cushions and frame further supported by a plurality of springs for controlling the vertical movement of frame portions and the cushions.

While the construction herein illustrated pertains to automobile seating, it is to be understood that such illustration is by way of example, and that similar types of seats may be utilized as chairs, davenports and the like.

The frame of the seat is constructed from steel tubing of normal carbon content which may be readily formed and deflected, but which is not considered as embodying spring characteristics.

In one form of the invention herein illustrated, the tubing is formed to have side base portions of a C-shape, open in the rear with a back portion extending upwardly therefrom. Between the opposite sides of the frame portions, the back and seat cushions are supported or directly constructed on cross members provided therebetween. When the seat cushion is occupied, the frame will deflect at the back due to the rear opening in the base portion. A plurality of heavy springs of any suitable type span the rear openings in the C-shaped base portions of the frame. The springs reduce the strain on the tubular frame when deflected so as to be well within the elastic limit of the tubular material. The springs not only provide resiliency to the frame and control the degree of deflection downwardly, but also function as snubbing members which reduce the tendency to throw the seat occupants upwardly when the vehicle travels over rough terrain. The back cushion and the seat cushion deflect in unison following the movement of the frame.

In another construction herein illustrated, the back frame extends upwardly from the base frame, and the rear ends of the seat supporting frame are pivoted to the back frame and supported on a row of heavy springs at the front edge. In a further construction herein illustrated, a C-shaped tubular frame is provided at the base, open in the front, with the back frame extending upwardly therefrom at the rear. A plurality of heavy springs are disposed in the open front edge of the base frame to permit the front edge of the cushion to deflect. The degree of deflection is controlled by said heavy springs disposed across the front of the seat cushions and the bending moment of the cushion supporting portion of the frame. Not only is resiliency provided to the seat cushion in the normal manner by the springs provided therein but the cushion itself deflects as a unit along one edge thereof, in an amount depending upon the load which is supported thereby.

Accordingly, the main objects of the invention are to provide a seat frame made of tubular elements for supporting seat and back cushions in a manner to permit portions of the frame to deflect on springs, which relieves the strain on the frame; to provide a frame having C-shaped base portions opening at one edge for supporting seat and back cushions in a manner to permit the cushions to deflect with the frame an amount controlled by a plurality of springs when compressed and which function as snubbers when tensioned; to provide a seat structure having a base and back frame on which a seat frame is pivoted and supported along the front edge on springs which control its downward deflection and snub its upward movement; and in general to provide a seat construction as herein illustrated which is simple in construction and economical of manufacture.

Other objects and features of novelty of the invention will be specifically pointed out or will become apparent when referring, for a better understanding of the invention, to the following description taken in conjunction with the accompanying drawings wherein:

Figure 1 is a side view of a seat frame, with a part in section, embodying the features of the present invention;

Fig. 2 is an enlarged sectional view of the seat frame illustrated in Fig. 1, taken on the line 2—2 thereof;

Fig. 3 is a reduced plan view, in front elevation, of a portion of the seat back, illustrated in Fig. 1;

Fig. 4 is a broken plan view of the seat frame illustrated in Fig. 1;

Fig. 5 is a broken view of structure, similar to that illustrated in Fig. 1, showing a further form of the invention;

Fig. 6 is a broken plan view of the seating portion of the seat structure illustrated in Fig. 5;

Fig. 7 is a front end view of the structure illustrated in Fig. 5;

Fig. 8 is an enlarged rear view of a portion of the seat structure as illustrated in Fig. 5, viewed from line 8—8 thereof.

Referring to Figs. 1–4, inclusive, the seat therein illustrated embodies a frame 12 having at each side a floor-engaging portion 13, an upwardly extending front portion 14, a rearwardly extending portion 15, which projects upwardly to form a back portion 16, the back portions 16 being joined across the top by a tubular portion 17. The rearwardly extending portions 15 are interconnected by tubular elements 18 and 19 at the rear and forward ends, respectively. The ends of the tubular elements 18 and 19 are formed to mate with the tubular portion of the main frame so that they can be directly welded thereto. Between the side frame portions 15 medially of the ends of the elements 18 and 19, a strainer tube 21 is secured, as illustrated more specifically in Figs. 1 and 4. The strainer tube projects downwardly below the rearwardly extending portions 15 to permit the springs to deflect without interference. The ends of the strainer tube 21 are formed to encompass the tubular elements 18 and 19 to which they are directly welded.

Cushion springs are provided between the back frame portions 16 and the seat frame portions 15, which may be of any desired type and which are herein illustrated as being spring strips 22. These strips 22 are made of wire bent back and forth to provide adjacent oppositely-directed loops joined by straight portions. The strips are preferably set on an arc of small diameter so that when the ends are stretched apart and secured to a frame the strips will offer resistance to deflection and thereby resiliently support a load.

Suitable clips 23 are welded or otherwise secured to the tubular portions 17, and elements 18 and 19 of the frame for securing the ends of the spring strips 22. The strips extend between the tubular portion 17 and element 18 to form a spring base for a back cushion and between the elements 18 and 19 to form a spring base for the seat cushion. Padding, which may be made of rubber, cotton, or other suitable material may be applied over the top of the spring strips 22 to build up the back and seat cushions and to provide comfort thereto after trim material is applied thereon.

Spring-supporting plates 24 are attached to the floor engaging portions of the frame 13 and to the portions 15 directly thereabove for supporting heavy coil spring 25 at each side of the seat frame at the open rear portion thereof. Tabs 26 are struck from the plates 24 for the purpose of encompassing the endmost coils of the spring for retaining the springs in position when deflected and when stretched so as to provide a snubbing action in the latter case when there is a tendency to throw the seat and occupant upwardly.

A bracket 27 is welded to the forward end of the base portion 13 of the tubular frame having an end portion 28 containing a slot 29 by which the seat is secured to a floor bracket 29' having a pin 30' disposed within the slot 29. When the seat is occupied, the rear edge of the portions 15 deflects downwardly an amount controlled by the resistance to deflection of the frame, and the heavy coil springs 25. Any shock occurring to the base portion 13 of the seat due to the vehicle traveling over rough terrain will be cushioned by the springs 25 and by the material of the frame which, as pointed out hereinabove, has a minimum spring characteristic. In case the shock is sufficient to cause the occupant to be thrown upwardly, the springs and frame then act as a snubber to reduce the upward movement of the seat and the occupants thereof. Accordingly, in addition to the comfort provided by the seat and back cushions, additional riding comfort is provided due to the deflection of the frame and springs which permits the seat and back to deflect in unison with each other. The material of the frame dampens the action of the springs 25 and a floating support is provided to the entire seat structure.

Referring to Figs. 5-8, inclusive, a further form of the invention is illustrated wherein a frame 30 is made of tubing formed to provide base portions 31 and back-supporting portions 32 at the sides interconnected across the top by a portion 17, as illustrated in Fig. 1. The arcuate portions of the frame between the portions 31 and 32 may be reinforced by a tubular element 40 telescoped therewith, as illustrated in Fig. 5. At the front, the frame is bent upwardly at the corners 33, and laterally across the front at 34, and upwardly at 35 and laterally at 36 to have the front portion 36 disposed at a greater height from the floor than the portion 34. A frame portion 37 for supporting the seat cushion embodies a tubular element of U-shape having flattened ends 38 which are pivoted to the frame portion 30 by pivots 39. The back supporting frame portion 32 is interconnected at the bottom, above the pivots 39, by the tubular element 18. The frame portion 37 has a laterally extending portion 41 across the front joined to the side portions 42, which have the ends flattened at 38, or which are welded to telescoped tubular elements 43 having the flattened ends.

A tubular element 44 extends between the rear ends of the side tubular portions 42 of the seat frame 37, which is braced by a strainer 21 which extends therefrom to the front tubular portion 41 of the seat frame. A plurality of spring supporting plates 24 are secured along the front tubular portions 34 and 36 of the base frame 31, and along the front portion 41 of the seat frame 37, in vertical aligned relation for supporting the springs 25 between the portions 34 and 41. Springs 46 of smaller length than the springs 25 are supported between the portions 36 and 41.

The pivot 39, as illustrated in Fig. 8, has an outboard support provided by a stamping or bracing element 47 which is welded to the element 18 across the back frame and to the upwardly extending portion 32 of the base frame. The pivot is illustrated as being a bolt, but it is understood that a rivet or other type of pivot could be utilized. The seat and back cushions are formed in the same manner as that hereinabove described with respect to the seat construction of Fig. 1. The cushion is deflectable at the front edge against the tensions of the springs 25 and 46, which springs are supported by the plates 24 in a manner to permit the springs to be tensioned, and thereby provide a snubbing action to resist the upward movement of the front edge of the seat cushion.

In any of the arrangements herein illustrated, the resiliency of the springs and cushion is augmented by the deflection of the seat frame portion against a plurality of springs, which limits the degree of deflection and reduces the strain on the frame elements, preventing them from deflecting beyond the elastic limit of the material from which the frame is constructed. The springs not only function to control the deflection and to provide resiliency to one lateral edge of the frame, but also function as snubbers in case the occupants of the seat are thrown upwardly when the vehicle in which the seat is supported travels over rough terrain. Any tendency to throw the occupants upwardly due to the upward movement of the seat frame portions and the springs 25 is immediately snubbed by the tension of the springs and by the resistance offered by the frame portions when stressed by such upward movement. The springs 25 and 46 are herein illustrated as being of the coil-type and it is to be understood that jack springs, leaf springs, or springs of other known types could be utilized for supporting the load, controlling the deflection of the seat frame portion, and snubbing any upward movement of the seat frame portion in the manner referred to above. While the seat and back cushions are illustrated as being constructed from zig-zag spring strips, other types of springs could be utilized in the frame for constructing the cushions.

What is claimed is:

1. In a seat construction, a frame element having at each side a floor engaging portion extending upwardly to form a back cushion supporting portion made of tubular stock, a tubular element telescoped within said tubular stock on each side at the junctions between the floor-engaging and back cushion supporting portions thereof to provide additional strength thereto, a seat cushion supporting frame portion of U-shape having the ends secured individually to the side portions of said back cushion supporting portion and disposed in vertically aligned, spaced relation to the floor engaging portions, and springs supported between said seat frame portion and floor engaging frame portions for controlling the deflection of the seat cushion supporting portion.

2. In a seat construction, a frame element having at each side a floor engaging portion extending upwardly to form a back cushion supporting portion made of tubular stock, a tubular element telescoped within said tubular stock on each side at the junctions between the floor engaging and back cushion supporting portions thereof to provide additional strength thereto, a seat cushion supporting frame portion of U-shape having the ends secured individually to the side portions of said back cushion supporting portion and disposed in vertically aligned, spaced relation to the floor engaging portions, springs supported between said seat frame portion and floor engaging frame portions for controlling the deflection of the seat cushion supporting portion, said connection between the seat cushion supporting frame portion and the back cushion supporting frame portion being pivotal to permit the front edge of the seat cushion supporting frame portion to hinge relative thereto.

3. In a seat construction, a frame element having at each side a floor engaging portion extending upwardly to form a back cushion supporting portion made of tubular stock, a tubular element telescoped within said tubular stock on each side at the junctions between the floor engaging and back cushion supporting portions thereof to provide additional strength thereto, a seat cushion supporting frame portion of U-shape having the ends secured individually to the side portions of said back cushion supporting portion and disposed in vertically aligned, spaced relation to the floor engaging portions, and springs supported between said seat frame portion and floor engaging frame portions for controlling the deflection of the seat cushion supporting portion, said floor engaging portion having a section disposed above the bottom of the rest of floor engaging portion, said springs being of different length conforming to the varying height of said last portion.

4. In a seat construction, a frame having a floor engaging portion at each side extending upwardly at the rear to form back cushion supporting portions, frame portions extending across the top of the back cushion supporting portions and the forward ends of the floor engaging portions, a separate frame element for supporting a seat cushion having a front portion and two side portions extending rearwardly therefrom, means for pivoting the ends of the side portions individually to the upwardly extending frame sections of the back cushion supporting portion, plates secured to the top of the frame portion extending across the forward ends of the floor engaging frame portions and to the underside of the front portion of the seat cushion supporting element in vertical, aligned relation, and springs secured to said plates.

5. In a seat construction, a frame having a floor engaging portion at each side extending upwardly at the rear to form a back cushion supporting portion, said frame having portions extending across the top of the back cushion supporting portion and the forward ends of the floor engaging portions, a separate frame element for supporting a seat cushion having a front portion and two side portions extending rearwardly therefrom, means for pivoting the ends of the side portions to each of the upwardly extending frame sections of the back cushion supporting portion, plates secured to the top of the joining portion of the floor engaging frame portions and to the underside of the front portion of the seat cushion supporting element in vertical, aligned relation, springs secured to said plates, said front portion joining the side floor engaging frame portions being arched upwardly at the center, and said springs supported at said arched portion being of shorter length than the said springs disposed outwardly thereof.

6. In a seat construction, a frame having a floor engaging portion at each side extending upwardly at the rear to form a back cushion supporting portion, said frame having portions extending across the top of the back cushion supporting portion and the forward ends of the floor engaging portions, a separate frame element for supporting a seat cushion having a front portion and two side portions extending rearwardly therefrom, means for pivoting the ends of the side portions to each of the upwardly extending frame sections of the back cushion supporting portion, plates secured to the top of the joining portion of the floor engaging frame portions and to the underside of the front portion of the seat cushion supporting element in vertical, aligned relation, springs secured to said plates, said front portion joining the side floor engaging frame portions being arched upwardly at the center, said springs supported at said arched portion being of shorter length than the said springs disposed outwardly thereof, a frame element extending between the upwardly extending frame sections of the back cushion supporting portion near the floor engaging portions of the frame, and bracing elements disposed between said frame element and said upwardly extending frame sections having a portion spaced from said sections to form inboard supports for the pivots of said seat frame.

References Cited in the file of this patent

UNITED STATES PATENTS

| Number | Name | Date |
|---|---|---|
| 142,927 | Medcalf | Sept. 16, 1873 |
| 533,009 | Holland | Jan. 22 1895 |
| 1,261,396 | Jackman | Apr. 2, 1918 |
| 1,791,453 | Mies | Feb. 3, 1931 |
| 1,928,939 | Larsen | Oct. 3, 1933 |
| 1,984,786 | Dujardin | Dec. 18, 1934 |
| 2,019,159 | Saunders | Oct. 29, 1935 |
| 2,170,923 | Jacobs | Aug. 29, 1939 |
| 2,300,422 | Hickman | Nov. 3, 1942 |
| 2,366,730 | Hickman | Jan. 7, 1945 |

FOREIGN PATENTS

| Number | Country | Date |
|---|---|---|
| 142,208 | Great Britain | May 6, 1920 |
| 451,909 | Great Britain | Aug. 13, 1936 |